United States Patent [19]

Nagano

[11] Patent Number: 4,576,587
[45] Date of Patent: Mar. 18, 1986

[54] FRONT CHAIN GEAR FOR A BICYCLE

[75] Inventor: Masashi Nagano, Izumi, Japan

[73] Assignee: Shimano Industrial Company Limited, Osaka, Japan

[21] Appl. No.: 579,970

[22] Filed: Feb. 14, 1984

[30] Foreign Application Priority Data

Feb. 19, 1983 [JP]  Japan .................................. 58-26783

[51] Int. Cl.[4] ............................................ F16H 55/30
[52] U.S. Cl. ..................................... 474/152; 474/141
[58] Field of Search ................... 474/152, 162, 78, 141

[56] References Cited

U.S. PATENT DOCUMENTS

| 591,488 | 10/1897 | McMullin | 474/141 X |
|---|---|---|---|
| 3,259,398 | 7/1966 | Hattan | 474/141 X |
| 3,899,932 | 8/1975 | Durham | 474/141 |

Primary Examiner—Stephen J. Novosad
Assistant Examiner—Thuy M. Bui
Attorney, Agent, or Firm—Stevens, Davis, Miller & Mosher

[57] ABSTRACT

A front chain gear for a bicycle, which is approximately elliptic in shape and of different pitch diameters. Teeth at the largest pitch diameter portion of the chain gear are made smaller in height than those at the smallest pitch diameter portion. Thus, the chain gear has a nearly exact addendum circle.

3 Claims, 5 Drawing Figures

FRONT CHAIN GEAR FOR A BICYCLE

FIELD OF THE INVENTION

This invention relates to a chain gear for a bicycle, and more particularly to a chain gear for a bicycle, which has a large number of teeth provided circumferentially of the outer periphery of the gear body so that a driving chain engages with the teeth to transmit a driving force to the rear wheel and which is used mainly in connection with a multistage front chain gear assembly.

BACKGROUND OF THE INVENTION

Generally, multistage front chain gear bicycle assemblies comprise round chain gears different in tooth number and mounted to a crank means at the bicycle. The chain is shifted through a front derailleur from one chain gear to another for changing the bicycle speed.

Now, the front chain gear, while a cyclist on a saddle is pedalling the bicycle, is subjected to a constant load from a rear wheel through the chain and a rear chain gear, but a pedalling torque changes due to the position of the pedal, in turn a crank arm, so that the maximum torque is obtained in a region where each crank arm turns at an angle of about 70°±5° ahead of the upper dead point thereof and the minimum torque in the vicinity of the upper or lower dead point as shown in FIG. 3.

In a case of using a conventional round chain gear, in spite of the fact that the torque changes in one cycle period of pedalling, the angular velocity of the crank arm for rotating the front chain gear is constant, so that the cyclist's physical burden is heavy and the power in one cycle period of pedalling is lower in comparison with such heavy physical burden.

The inventor has proposed in Japanese patent application Ser. No. Sho 57-94,396 (U.S. patent application Ser. No. 497,051) a chain gear non-round but nearly elliptic, which changes the angular volocity of the pedal in one pedalling cycle period in consideration of a variation in torque and a speed pattern on the basis of inherent motion of the cyclist's legs like a swing of a pendulum. Specifically, the inventor has observed that if the peripheral speed in pedalling increases for the maximum torque, the power can be improved without increasing the physical burden on the cyclist, and if the same decreases for the torque, the physical burden can be reduced. Hence, the proposed chain gear is nonround but nearly elliptic and of different gear diameters and assembled with the crank means so that the gear diameter becomes a minimum of thereabout in the region where the maximum torque by pedalling is obtainable between both the upper and lower dead points of the crank arm and the same becomes a maximum or thereabout in the vicinity of the upper or lower dead point of crank arm where the minimum torque only is obtainable.

In other words, when each crank arm is positioned in the region where the maximum torque is obtained by pedalling to move the cyclist's legs faster due to the inherent motion thereof, the smaller gear-diameter portion of the chain gear corresponds to the crank arms to thereby increase the circumferential speed of the pedal. Conversely, when the crank arms are positioned in the vicinity of the upper and lower dead points so that the minimum torque only is obtained and the movement of the legs becomes slow, the larger diameter portion of the same corresponds to the crank arms so as to reduce the circumferential speed.

Accordingly, the power in one cycle period of pedalling is improved as a whole and the energy consumption of the cyclist reduces to perform smooth pedalling.

However, in a case where the non-round chain gear is used as a larger diameter chain gear at the multistage front chain gears, the chain, when shifted from a smaller diameter gear to the larger diameter one, may be excessively over-shifted by a chain guide, thereby creating a problem in that the chain often falls down outwardly beyond the larger diameter gear.

The reason for the above is that an interval 1 between the lower surface of the chain guide and the crest of each tooth at the larger pitch diameter portion is made proper (e.g., 1 to 5 mm) in consideration of preventing contact with both the members. Consequently, an interval between the same and the crest of each tooth at the smaller pitch diameter portion becomes inevitably larger than the above proper interval 1 by one-half of the difference between both the pitch diameters. Hence, an amount of over-shift of the chain guide necessary to shift the chain from the smaller diameter gear to the larger diameter one becomes excessive.

SUMMARY OF THE INVENTION

An object of the invention is to provide a front chain gear of a non-round shape, whose teeth at the larger pitch diameter portion are different in height from those at the smaller pitch diameter portion, thereby reducing a difference between the diameters of the addendum circles, thus always maintaining a proper interval between the chain guide and the tooth crest at any tooth of the chain gear.

In other words, the non-round front chain gear of the invention comprises a gear body with a large number of teeth provided circumferentially of the outer periphery of the gear body and which has different pitch diameter portions to have a largest pitch diameter portion and a smallest pitch diameter portion, and which has teeth at the largest pitch diameter portion made smaller in height than those at the smallest pitch diameter portion to thereby form an addendum circle of nearly exact circularity. Hence, the aforesaid interval is kept always proper at any tooth of the larger diameter gear to thereby prevent the chain from falling down beyond the larger diameter gear.

The above and further objects and novel features of the invention will more fully appear from the following detailed description when the same is read in connection with the accompanying drawings.

DETAILED DESCRIPTION OF THE INVENTION

Figure 1:
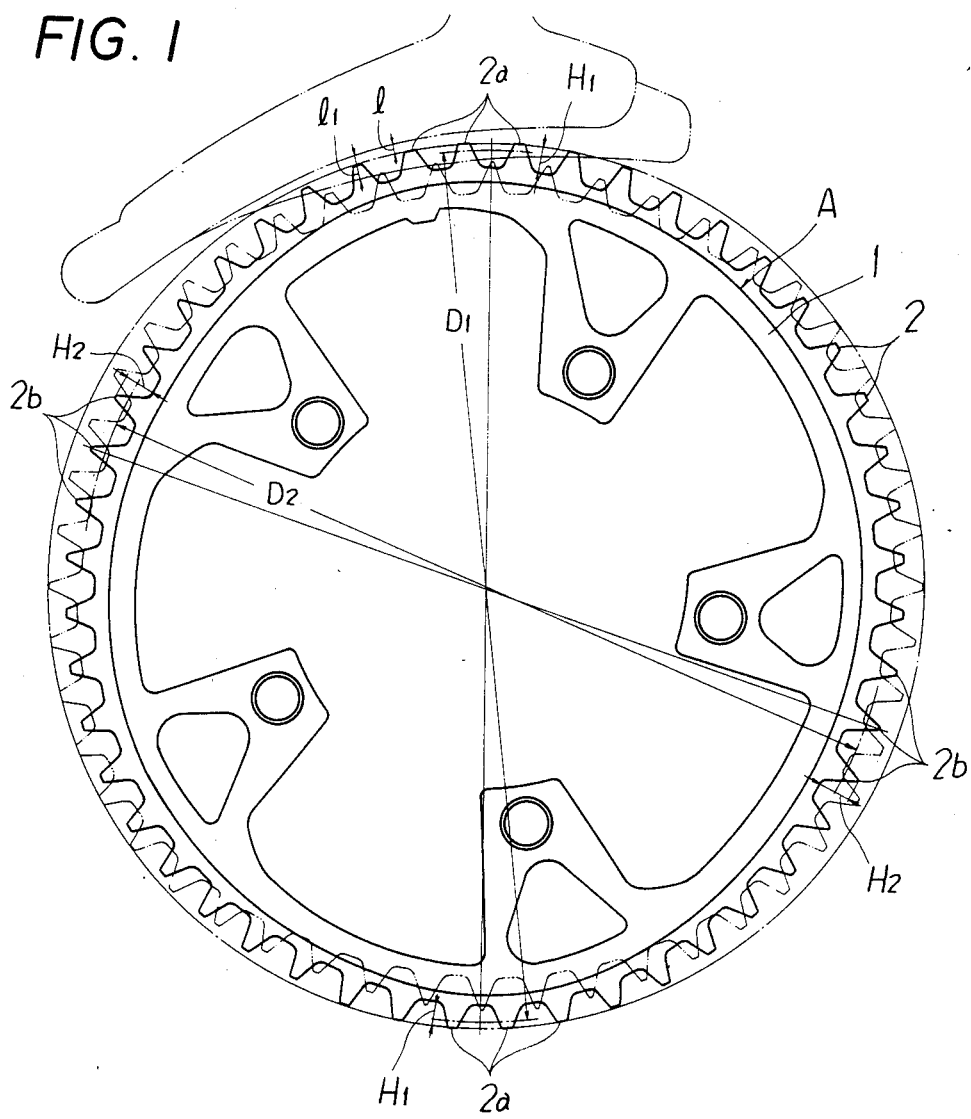
FIG. 1 is a front view of an embodiment of a front chain gear of the invention, in which a chain guide is shown by the phantom line.

Referring to FIG. 1, a chain gear A comprises a ring-like-shaped gear body 1 formed of a metal plate and a number of teeth 2 provided circumferentially of the outer periphery of gear body 1 and spaced at regular intervals. Teeth 2 are chamfered in a direction extending along the thickness of gear body 1.

The chain gear A is made substantially elliptic in shape and has different pitch diameter portions. Teeth 2b at a portion of gear A having the smallest pitch diameter $D_2$ and at portions adjacent thereto are extended at their tips radially outwardly and are made larger in height by, for example, 1 mm than the standard value (usually 6 mm) provided in the Japanese Industrial Standard, thus enlarging a diameter of the addendum circle at the tooth 2b to a maximum. Alternatively, the tooth height at the smallest pitch diameter portion may be equal to the above standard value.

On the other hand, teeth 2a at a portion of the largest pitch diameter $D_1$ and thereabout are cut out at their tips by a predetermined length to be smaller by, for example, 1 mm, than the above standard value. In addition, each tooth 2a corresponds in height to each pitch diameter.

Figure 2:
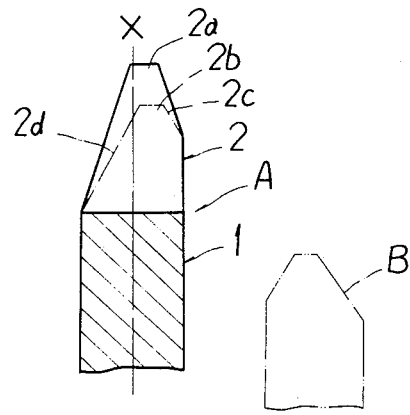
FIG. 2 is a partially enlarged sectional view of a tooth tip at the chain gear in FIG. 1.

Teeth other than those 2b and 2a are gradually reduced in height from the teeth 2b at the smallest pitch diameter $D_2$ portion to those 2a of the largest pitch diameter $D_1$ portion as shown in FIG. 2. Hence, the chain gear A, in spite of being different in pitch diameter, has an addendum circle of approximately perfect circularity.

Also, the respective teeth 2a are chamfered to a lesser extent at one side 2c thicknesswise of chain gear A and to a larger extent at the other side 2d, thereby shifting the tooth tip thicknesswise one-sidedly, in other words, toward a round chain gear B of smaller diameter to be discussed below.

Figure 5:
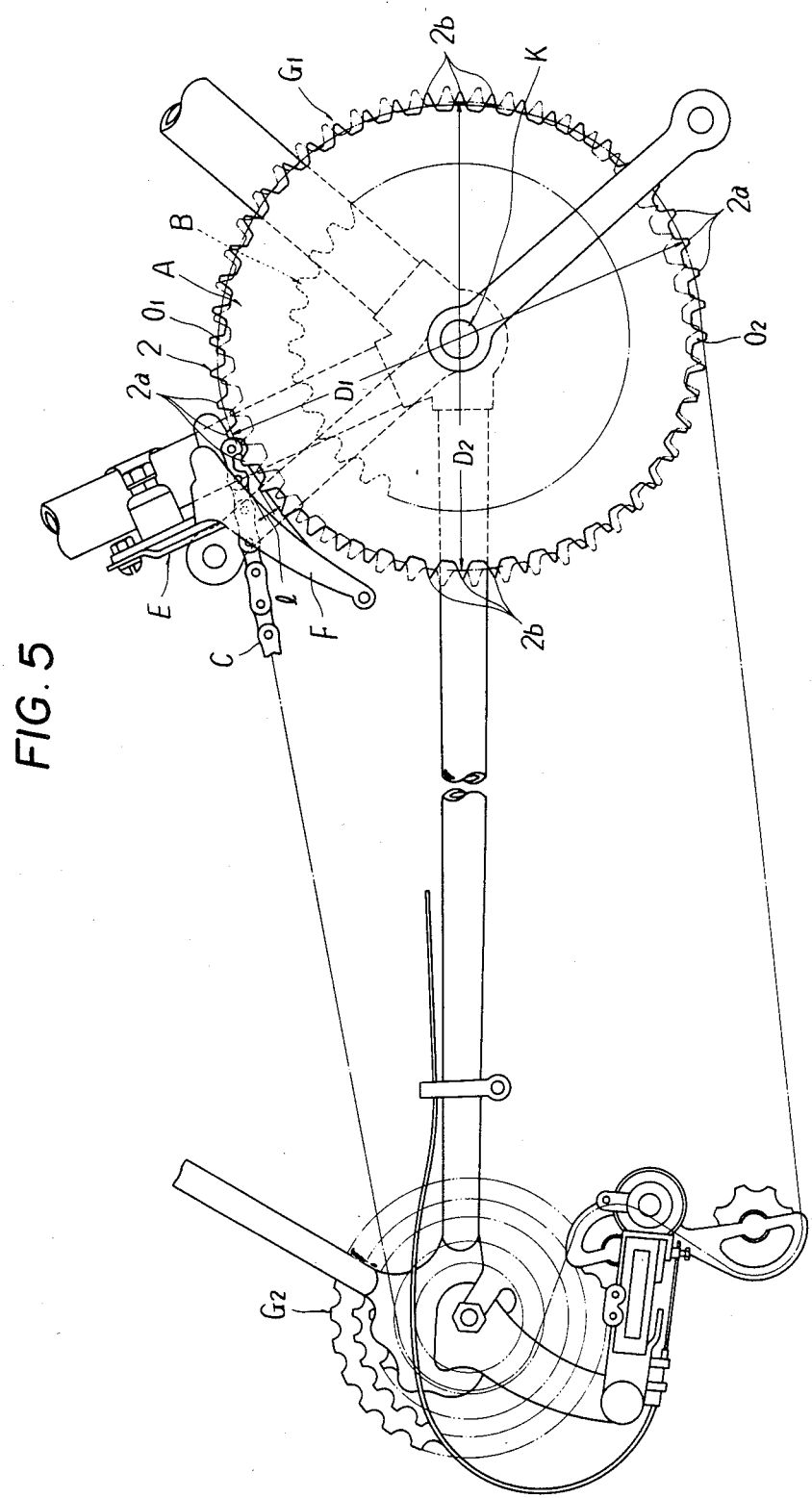
FIG. 5 is a view explanatory of the chain gear of the invention assembled in the bicycle.

The chain gear A constructed as foregoing, as shown in FIG. 5, is assembled with the smaller diameter chain gear B less in tooth number than the gear A so that the chain gear assembly is mounted to a crank means K and used as the multistage front chain gear assembly $G_1$. A driving chain C is carried across front gear A or B and one rear chain gear $G_2$ and transmits a driving force by pedalling from the front gear A or B to the rear gear $G_2$ to drive a rear wheel at the bicycle. A front derailleur E is provided at the tension side of chain C and in proximity to the front gear assembly $G_1$, and a chain guide F at the derailleur E shifts the chain C to the selected chain gear A or B for changing the bicycle speed, the chain guide F being disposed to keep a proper interval 1(about 1 to 5 mm ) from the tip of each tooth 2a.

Thus, each tooth 2b at the smallest pitch diameter $D_2$ can be kept in proper interval from the chain guide F because the teeth 2a are smaller in height than those 2b to form a nearly exact addendum circle.

As seen from the above, the aforesaid interval between the chain guide F and the teeth 2b at the smallest pitch diameter $D_2$ portion is not so large as the conventional gear so that the chain C is reliably shiftable without excessive over-shift when shifted from the smaller diameter gear B to the larger diameter one A. Hence, the chain C is prevented from falling down beyond the larger diameter chain gear A.

Furthermore, the teeth 2a at the largest pitch diameter $D_1$ portion of chain gear A are displaced at their tips toward the smaller diameter gear B, thereby being easy to engage with the chain C, thus further improving the speed change efficiency.

Next, explanation will be given regarding assembly of chain gear A to the crank means K.

The non-round chain gear A, as shown in FIG. 5, is positioned at the largest pitch diameter $D_1$ portion ahead of crank arms KA in its driving direction (clockwise in FIG. 5) and fixed thereto. Hence, when the crank arm KA is positioned in the region where the same after passing the upper dead point $O_1$ is obtainable of the maximum torque, the smallest pitch diameter $D_2$ portion corresponds to the region for maximum torque. When the crank arm KA is positioned in the vicinity of upper and lower dead points $O_1$ and $O_2$, the largest pitch diameter $D_1$ portion corresponds to the aforesaid region.

Figure 3:
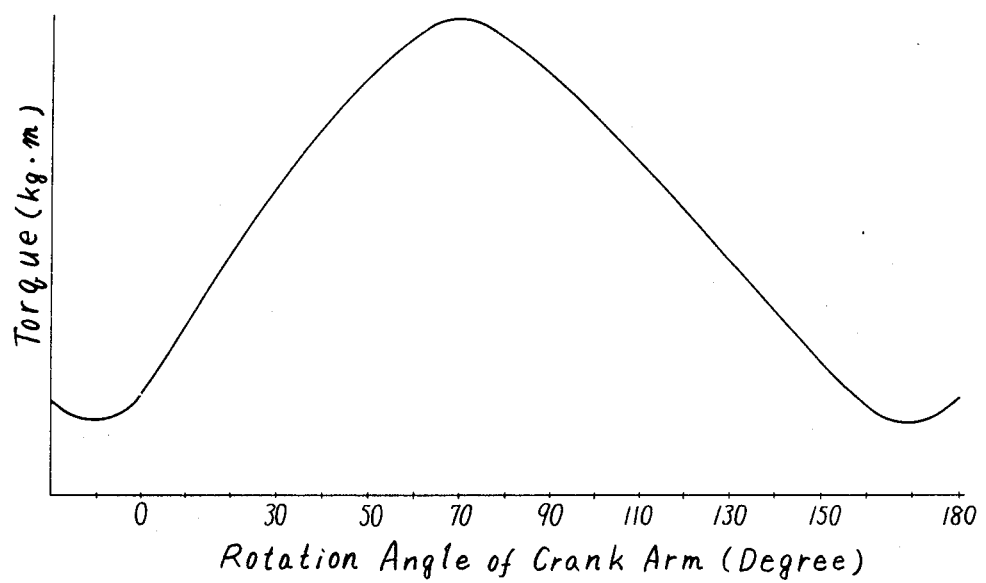
FIG. 3 is an illustration of a relation between the rotational angle and the pedalling torque.
Figure 4:
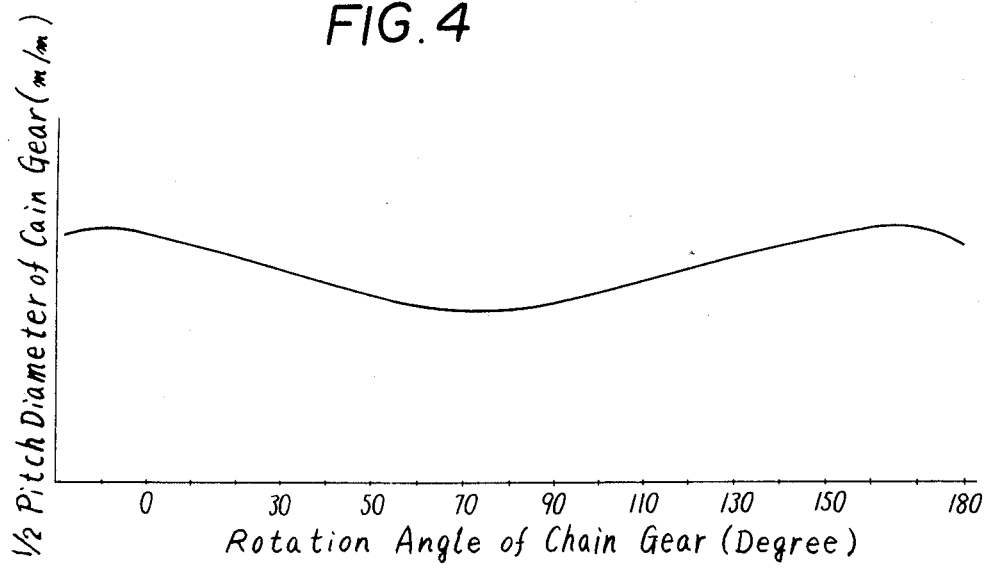
FIG. 4 is an illustration of a relation between the rotational angle of the chain gear and one-half of the pitch diameter.

Also, such assembly of chain gear A to the crank means K is carried out in consideration that the pedalling torque changes for one cycle period thereof as shown in FIG. 3.

In greater detail, in the region where each crank arm KA turns at an angle of 30° to 120° ahead of the upper dead point $O_1$ in the driving direction of crank arm KA to thereby obtain the maximum pedalling torque, the chain gear A is positioned at the smallest pitch diameter portion thereof. Hence, a gear ratio between the chain gear A and each rear chain gear G is reduced, whereby the angular velocity of the pedal is increased to further improve the power in the region where the large torque is essentially obtainable and matched with the speed pattern derived from the movement of the cyclist' leg. In the vicinity of the upper and lower dead points where the smaller torque only is obtained, the chain gear A is positioned at the largest pitch diameter portion thereof to thereby increase the aforesaid gear ratio. Hence, the angular velocity of the pedal is reduced to match the speed pattern by the movement of the cyclist's leg, thereby lightening the physical burden of the cyclist.

As seen from the above, in the region where the larger torque is obtainable, the pitch diameter becomes minimum and the angular velocity of the pedal becomes larger, whereby the cylist can drive the bicycle at the highest power. Moreover, in this region, he can move his legs faster to match the speed pattern by the legs in pendulum-like motion.

Conversely, in the vicinity of the upper and lower dead points, the pitch diameter becomes maximum and the angular velocity is reduced thereby to lower somewhat the power in comparison with the conventional gear, but a larger torque is not obtainable essentially near the dead points. As a result, the workload is not so much affected and the cyclist rather experiences a lightened physical burden and also his legs move slowly to match well with the speed pattern thereof.

Thus, the power is improved to be high as a whole in the region where the larger torque is obtained, and the pedalling is matched with the speed pattern of the cyclist's legs. Hence, energy consumption during pedalling is reduced to lighten the cyclist's physical burden, and smooth pedalling is performable.

Incidentally, in a case where a ratio between the largest pitch diameter $D_1$ and the smallest one $D_2$ is 1.1:1, and when a round chain gear is used, the maximum torque of 30 kg-m and the minimum one of 5 kg-m are assumed to be obtained, and the ratio of angular velocity of the pedal for the chain gear A becomes 0.95 at the major axis side and 1.05 at the minor axis side with respect to the round chain gear. The chain gear A corresponds at the largest pitch diameter portion to the region where the minimum torque only is obtainable and at the smallest pitch diameter portion to the region where the maximum torque is obtainable, whereby the maximum torque of 28.5 kg-m and the minimum one of 5.25 kg-m at the chain gear A are given according to the formula: Power=Torque×Speed.

Accordingly, the torque increases by 0.25 kg-m at the largest pitch diameter portion and decreases by 1.5 kg-m at the smallest pitch diameter portion, whereby the proportion to decrement is larger. Thus, the maximum torque is reducible by 5 to 8% in measured value, so that, even when the minimum torque increases, an integrated value of torque for one cycle period of pedalling is reducible by 2 to 3%. Moreover, the movement of the cyclist's legs during pedalling can be matched in its inherent cycle period with the speed pattern, thereby saving energy for moving his legs. Hence, an integrated value in the electromyogram measured simultaneously is reducible by 2 to 3%.

As seen from the above, the front chain gear of the invention is made non-round and different in pitch diameter and has teeth at the largest pitch diameter portion which are made smaller in height than those at the smallest pitch diameter portion. Hence, the interval between the chain guide and the teeth of the chain gear can be kept always proper, whereby the chain, when shifted from the smaller diameter chain gear to the larger diameter one, is prevented from falling beyond the latter gear.

While a preferred embodiment of the invention has been described using specific terms, such description is for illustrative purpose only, and it is to be understood that changes and variations may be made without departing from the spirit of scope of the following claims.

What is claimed is:

1. A front chain gear for a bicycle, comprising a combination of at least one larger diameter chain gear with at least one smaller diameter chain gear, both said chain gears being different in tooth number from each other, at least said larger diameter chain gear being non-round in shape to provide a largest pitch diameter portion and a smallest pitch diameter portion, teeth at said largest pitch diameter portion being smaller in height than teeth at said smallest pitch diameter portion, whereby an addendum circle of said chain gear is of nearly exact circularity.

2. A front chain gear for bicycle according to claim 1, wherein tips of said teeth at said largest pitch diameter portion are displaced toward said smaller diameter chain gear with respect to tips of teeth at said smallest pitch diameter portion.

3. A front chain gear for a bicycle according to claim 1, wherein said chain gears include crank arms and said largest pitch diameter portion is displaced ahead of each of said crank arms in a forward driving direction thereof, said crank arms being assembled to said chain gears so that maximum torque is output from said smallest pitch diameter portion when said crank arms are positioned in a region where maximum torque is obtainable.

* * * * *